United States Patent
Adler et al.

(10) Patent No.: US 10,121,178 B2
(45) Date of Patent: Nov. 6, 2018

(54) THREE-DIMENSIONAL EYEGLASSES MODELING FROM TWO-DIMENSIONAL IMAGES

(71) Applicant: EBAY INC., San Jose, CA (US)

(72) Inventors: Itay Adler, San Jose, CA (US); Dan Sincai, San Jose, CA (US)

(73) Assignee: eBay Inc., San Jose, CA (US)

(*) Notice: Subject to any disclaimer, the term of this patent is extended or adjusted under 35 U.S.C. 154(b) by 474 days.

(21) Appl. No.: 14/738,861

(22) Filed: Jun. 13, 2015

(65) Prior Publication Data

US 2015/0362761 A1 Dec. 17, 2015

Related U.S. Application Data

(60) Provisional application No. 62/012,194, filed on Jun. 13, 2014.

(51) Int. Cl.
| | |
|---|---|
| G06K 9/00 | (2006.01) |
| G06Q 30/06 | (2012.01) |
| G06T 17/00 | (2006.01) |
| G06T 7/40 | (2017.01) |
| G06T 7/55 | (2017.01) |
| G06T 7/13 | (2017.01) |

(52) U.S. Cl.
CPC .......... G06Q 30/0621 (2013.01); G06T 7/13 (2017.01); G06T 7/40 (2013.01); G06T 7/55 (2017.01); G06T 17/00 (2013.01); G06T 2210/16 (2013.01)

(58) Field of Classification Search
CPC .......... G06Q 30/0621; G06T 7/13; G06T 7/55; G06T 17/00; G06T 7/40; G06T 2210/16; G06T 7/529
See application file for complete search history.

(56) References Cited

U.S. PATENT DOCUMENTS

| | | | | |
|---|---|---|---|---|
| 6,231,188 | B1* | 5/2001 | Gao | G02C 13/003 351/227 |
| 6,944,327 | B1* | 9/2005 | Soatto | G02C 13/003 351/159.75 |
| 8,733,936 | B1* | 5/2014 | Kornilov | A61B 3/10 351/159.75 |
| 9,081,212 | B1* | 7/2015 | Frost | G02C 11/02 |
| 2012/0313955 | A1* | 12/2012 | Choukroun | G06T 19/00 345/582 |
| 2013/0088490 | A1* | 4/2013 | Rasmussen | G06T 17/00 345/421 |

(Continued)

*Primary Examiner* — Samir Ahmed
(74) *Attorney, Agent, or Firm* — M&G eBay

(57) ABSTRACT

There are provided systems and method for three-dimensional (3D) eyeglasses modeling from two-dimensional (2D) images. A service provider, such as a payment provider, may access 2D images of a pair of eyeglasses, such as images from a front perspective and a side perspective of the eyeglasses. The contours of the eyeglasses may be extracted, such as the contours of the main features (e.g., the bridge, lens aperture, side and ear frame sections, and other important features). The contours may be processed to determine a curve that best fits the features. Additional features may be extracted, such as color, design, writing (e.g., a brand name on the frame), hinges, or other sub-feature of the frame. Utilizing this information, a 3D model of the pair of eyeglasses may be constructed by scaling the size of the lens curves, bridge, and/or arms and applying a texture.

20 Claims, 5 Drawing Sheets

(56) References Cited

U.S. PATENT DOCUMENTS

| | | | |
|---|---|---|---|
| 2014/0055570 A1* | 2/2014 | Dehais | G06T 17/20 348/47 |
| 2014/0078461 A1* | 3/2014 | Earley | G02C 1/08 351/90 |
| 2015/0055085 A1* | 2/2015 | Fonte | G06Q 30/0621 351/178 |

* cited by examiner

THREE-DIMENSIONAL EYEGLASSES MODELING FROM TWO-DIMENSIONAL IMAGES

CROSS-REFERENCE TO RELATED APPLICATIONS

This application claims priority to U.S. Provisional Patent Application Ser. No. 62/012,194, filed Jun. 13, 2014, which is hereby incorporated by reference in the aforementioned application's entirety.

TECHNICAL FIELD

The present application generally relates to three-dimensional eyeglasses modeling from two-dimensional images and more specifically to generating a three-dimensional model of eyeglasses by extracting contours, features, and textures shown in two-dimensional images of the eyeglasses.

BACKGROUND

Vision care providers may offer users online marketplaces where the users may browse eyeglass frames and select a pair of eyeglasses for purchase. These online marketplaces often offer two-dimensional (2D) images of glasses. While these 2D images may provide the user with information about the style, color, and/or brand of the eyeglasses frames, the 2D images do not provide an adequate model that may determine a fit for the user. Thus, the user may be concerned that a pair of eyeglasses may fit poorly, such as being too large or small for their head. Moreover, while a pair of eyeglasses may appear to be stylish when viewing the 2D images, the eyeglasses may actually have a different or undesirable look on the user when the user actually wears the glasses. For example, the front lens frame sections may be overly large or small and present a strange look on the user. The user may also prefer a larger or smaller lens size based on their vision preference, which may be undistinguishable from 2D images. In other embodiments, the bridge or arms of the pair of eyeglasses may present a poor fit for the user.

Figure 1:
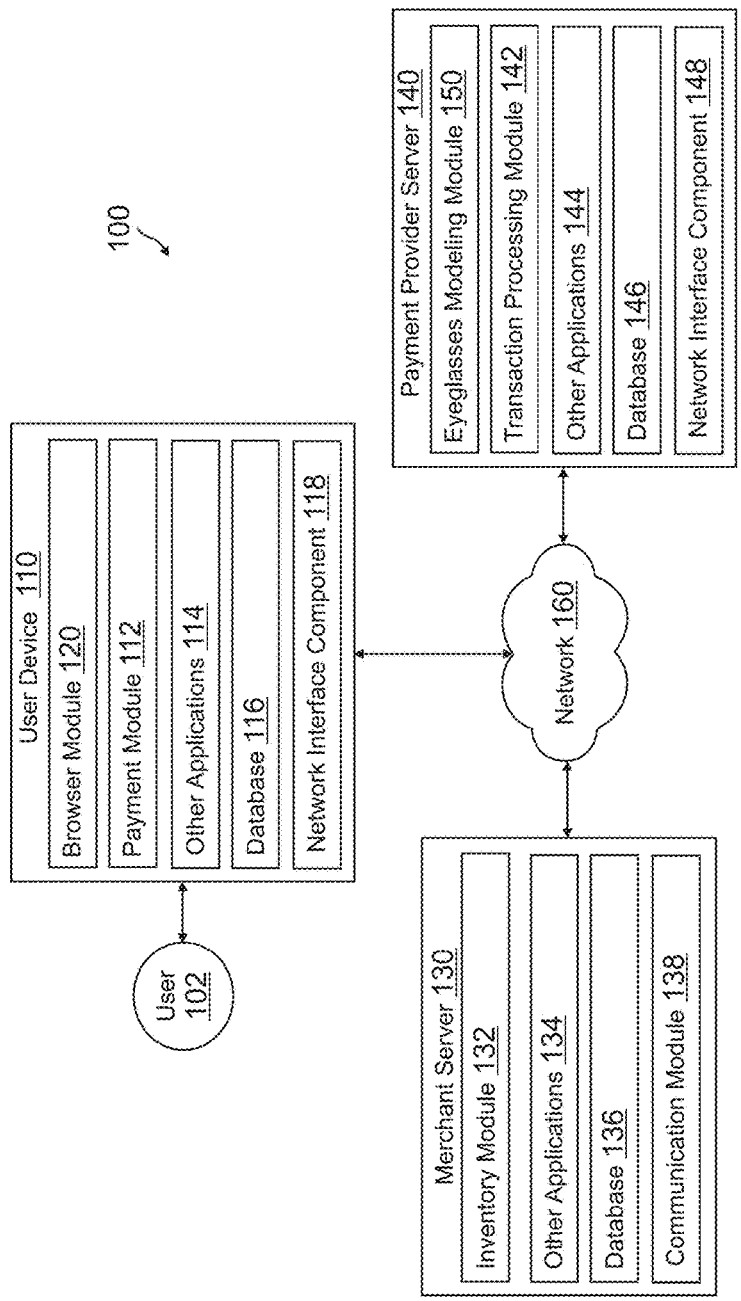
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for three-dimensional eyeglasses modeling using two-dimensional images. Systems suitable for practicing methods of the present disclosure are also provided.

A service provider, such as a payment provider, may offer three-dimensional (3D) modeling of eyeglasses to a merchant or other eyeglass provider. 3D models of pairs of eyeglasses may be provided to a user so that the user may utilize a virtual try-on with a device camera to present and model a pair of eyeglasses on an image of the user. Thus, the model may provide the user with an estimated size, shape, and fit for the pair of eyeglasses on an image or visual representation of the user. Moreover, the user may utilize the 3D model to view styles, colors, and lenses superimposed on the image of the user to make appearance and shopping selections. In contrast, a two-dimensional (2D) image of the glasses may not display correct fit, size, and shape to the user when superimposed on an image of the user.

The service provider may begin by accessing at least one image of a pair of eyeglasses, such as a 2D image of the eyeglasses. In various embodiments, more than one image may be utilized, such as a plurality of images taken from different placements, perspectives, positions, and/or ranges of the pair of eyeglasses. For example, an image may be taken of the front of the eyeglasses and the side of the eyeglasses. Other media and/or information for the eyeglasses may also be accessed, such as video data capturing the eyeglasses and/or eyeglass descriptions, measurements, and/or metadata for the images (e.g., when taken, a distance taken from the eyeglasses, etc.). The additional information may also be used to determine lens placement, transmissivity, and/or shading. Such information may be used to further model the eyeglasses.

The service provider may process the images to determine contours of the pair of eyeglasses, including contours of the main features of the eyeglasses. Contours of the pair of eyeglasses may correspond to angles, curves, lines, and other shape features of the pair of eyeglasses. For example, the contours may define the front, the frame, and/or the arms extending backwards and used to hold the pair of eyeglasses on the face of a user. The contours may also define lens shape, extension in a forward or backward direction, and other lens information. Thus, the contours of the features may be extracted, such as the contours of the front frame, including the frames surrounding the lenses, the contours of the edges, and/or the contours of the lenses in the frames. The contours may be extracted of the largest area using "Canny edge detection" from a front image of the eyeglasses. Canny edge detection may utilize one or more algorithms to detect a range of edges in an image, which may be used to define the contours. For example, Canny edge detection may be used to process an image to detect edges within the image by applying a Gaussian filter to smooth the image, find intensity gradients of the image, apply non-maximum suppression (e.g., an edge thinning technique to thin edges extracted from the gradient value) to get rid of spurious response to edge detection, apply a double threshold to select pixels of strong edges above an upper and lower threshold while also noting pixels of weak edges above the lower threshold but below the upper threshold, and then suppressing weak edges not connected to a strong edge pixel (e.g., edge tracking by hysteresis). Once the contours are extracted, the contours may be cleaned up and processed to extract a best curve that fits the desired feature. For example, a curve defining the area of the frame holding lenses may be determined.

Furthermore, the contours may also define a location of the hinges of the pair of eyeglasses. For example, the meeting of the arm contours to the lens frame contours may define a hinge of the pair of eyeglasses (e.g., a folding mechanism found in pairs of eyeglasses to fold the arms against the frame). The contours may further be used to determine a nose bridge feature of the pair of eyeglasses. For example, a nose bridge feature may join the frame of the pair of eyeglasses between the lenses to that the eyeglasses rest on a face/nose of a user using the nose bridge feature. The nose bridge feature may include measurements, weights, distances, and other information that may define how the pair of eyeglasses rest on a user and how securely the pair of eyeglasses fit when worn by the user. The nose bridge feature be in conjunction with the shape/size of the user's nose, the spatial relationship to the frame arms, and measurements of the user's face, including length from nose bridge to ears in order to determine a model, measurements, and/or other shape features of the pair of eyeglasses. The nose bridge feature may also include padding to raise the glasses from the nose and face, as well as if padding is an option.

In various embodiments, once the contours and the hinges are determined (and nose bridge feature where applicable), a texture file may be generated from both of the images. The texture file may include color, material, surface type, logos, and/or other visual features of the pair of eyeglasses. The texture file may be generated using the images by processing the images to determine various visual features of the pair of eyeglasses, which may define the color, material, etc. of the model built using the contours extracted. Using the contours and the texture file, a 3D model of the glasses may be constructed. The 3D model may extrude front, arms, and lenses curves, add and/or remove the lenses from the front model, scale the arms to match the front frame size so that the arms and front frame parts are both to scale, and attach the contours determined for the arms and the front together. The texture file may then be applied to the model and the model may be presented to a user for viewing with an image of the user. The 3D model may be communicated to the merchant for presentation on a website that allows the user to model the pair of eyeglasses on an image of the user, or may be communicated to the user directed (e.g., on user request from images supplied by the user). Moreover, a cleanup tool may be provided that allows the merchants and/or users to fix models which were not extracted correctly. The cleanup tool may allow parties to indicate, through graphical interfaces, which areas were not detected correct for further processing (e.g., repeating Canny edge detection). The parties may also correct hinge location by moving the hinges, may stretch or modify the model's measurements, and/or may apply curvature from a selection of presets. The cleanup tool may also provide processing without input by the parties, for example, by extending the arms in an outward direction automatically to accommodate for head sizing (e.g., that human heads widen at the back and arms of a pair of eyeglasses often accommodate by extending back and at an outward angle). Thus, other corrections may be automatically applied to correct for standard sizing and shape requirements.

The user may utilize a stored image or a device camera to capture the user's likeness and view the 3D model of the eyeglasses on the user's likeness. The image/likeness of the user may be scaled to fit the scale of the 3D model of the pair of eyeglasses. In other embodiments, the 3D model may be scaled to fit the user (e.g., based on a respective scale/size of the user's image/likeness and the scale/size of the 3D model) or the user may be instructed to capture the user's likeness at a specific distance from the camera. Such scaling for the 3D model of the eyeglasses may be determined through information of the 2D images and/or size information for the pair of eyeglasses. The nose bridge feature may be displayed to the user and used to fit the 3D model on the user. Additionally, the user may view options related to the nose bridge feature. The user may also view the pair of eyeglasses with additional information, such as weight, prescription (e.g., lens thickness and lens options, including thin lenses, color, shading, etc.), material, and eyeglasses options. Such options may affect how the 3D model is presented on the user, for example, by changing lens thickness to accommodate for prescription strength, weight based on lens thickness, shading for sunglasses, etc.).

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant server 130, and a payment provider server 140 in communication over a network 160. User 102 may utilize user device 110 to browse a marketplace for merchant server 130 and view 3D models of different pairs of eyeglasses. The 3D models of the pairs of eyeglasses may be determined by payment provider server 140 (or other service provider server) using information received from merchant server 130. For example, merchant server 130 may provide payment provider server 140 with 2D images of the pairs of eyeglasses. Thus, payment provider server 140 may determine the 3D models using the 2D images and provide the 3D models to merchant server 130 for use with advertising their inventory and sales.

User device 110, merchant server 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with merchant server 130 and/or payment provider server 140. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may operate similarly.

User device 110 of FIG. 1 contains a browser module 120, a payment module 112, other applications 114, a database 116, and a network interface component 118. Browser module 120, payment module 112 and other applications 114 may correspond to processes, procedures, and/or applications executable by a hardware processor, for example, a software program. In other embodiments, user device 110 may include additional or different software as required.

Browser module 120 may be used, for example, to provide a convenient interface to permit a user to access merchant server 130 and/or payment provider server 140. In one embodiment, browser module 120 may be implemented as a web browser configured to view information available over the Internet, for example, accessing a website. Browser module 120 may be configured to transmit and receive data over network 160, including receiving marketplace webpages displaying available eyeglasses from merchant server 130. Browser module 120 may correspond to an application that enables user 102 to browse eyeglasses, select eyeglasses for viewing, and view 2D images of the eyeglasses and 3D models of the eyeglasses. In this respect, browser module 120 may further enable user 102 to enter an image, video data, and/or capture image/video data having a likeness of the user to utilize with the 3D models. Thus, user 102 may view 3D models of pairs of eyeglasses on a likeness of user 102 in order to determine a fit, size, and/or scale of the pair of eyeglasses on user 102. Browser module 120 may therefore include plug-ins and other processes to capture the data including the likeness of user 102 or may import data having the likeness of user 102. Browser module 120 may also model the 3D model of the pair of eyeglasses on the likeness of user 102, or merchant server 130 may provide processes and features to model the 3D model on the likeness of user 102 and communicate the modeling to user 102 through browser module 120.

If user 102 chooses to purchase a pair of eyeglasses, payment module 112 may be utilized with browser module 120 to complete the purchase order for the eyeglasses. Payment module 112 may be used, for example, to provide a convenient interface to permit user 102 to select payment options and provide payment for the eyeglasses. Payment module 112 may be implemented as an application having a user interface enabling the user to enter payment options for storage by user device 110, provide payment on checkout of an item (e.g., eyeglass frames, lenses, and/or other eyeglass goods) with merchant server 130 and/or payment provider server 140, and complete a transaction for the item with merchant server 130 and/or payment provider server 140. In certain embodiments, payment module 112 may correspond more generally to a web browser configured to view information available over the Internet or access a website corresponding to a payment provider.

Payment module 112 may utilize user financial information, such as a credit card, bank account, or other financial account to complete payment. Additionally, payment module 112 may provide payment for the pair of eyeglasses using a user account with the payment provider, such as payment provider server 140. Payment module 112 may include cross-linking, allowing user 102 to identify a user account through an identifier for a separate user account (e.g., identifying a user account through a debit card account number and vice versa). Payment module 112 may further include options to store transaction histories for purchased eyeglasses, such as receipts, for later use, including redemption of the purchased item at a physical merchant location. Thus, payment module 112 provides an interface enabling user 102 to provide proof of purchase of an item to a merchant. Payment module 112 may further be utilized to provide shipping options for the delivery of the purchased eyeglasses. Once a transaction for the eyeglasses is completed, merchant server 130 and/or payment provider server 140 may complete the eyeglasses and deliver them to user 102.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with payment provider server 140. Additionally, other application may include browser applications, social media applications, camera applications, and/or mapping/check-in applications. Other applications 114 may contain other software programs, executable by a processor, including a graphical user interface (GUI) configured to provide an interface to the user.

User device 110 may further include database 116 which may include, for example, identifiers such as operating system registry entries, cookies associated with browser module 120, payment module 112, and/or other applications 114, identifiers associated with hardware of user device 110, or other appropriate identifiers, such as identifiers used for payment/user/device authentication or identification. In one embodiment, identifiers in database 116 may be used by user device 110, merchant server 130, and/or payment provider server 140, to associate user device 110 with a particular account maintained by payment provider server 140. Database may include information utilized by browser module 120 including images of user 102, video data of user 102, and/or metadata for images/video data. The metadata may correspond to a time for the images/video data of user 102, a distance a device camera was when capturing the images, or other necessary metadata.

Database 116 may include information used by payment module 112, for example, user personal information (e.g. a name, social security number, user financial information, or other identifying information), a user account identifier (e.g. user account identifier is at least one of a user identifier, a user credit or debit card number, a user account name, and a user account number), and/or a user device identifier. In various embodiments, database 116 may include online account access information.

In various embodiments, user device 110 includes at least one network interface component 118 adapted to communicate with merchant server 130 and/or payment provider server 140. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Merchant server 130 may correspond, for example, to a merchant or seller offering eyeglasses for sale to user 102. Generally, merchant server 130 may be maintained by anyone or any entity that receives money in exchange for vision care, which may include online marketplaces, vision care chains, independent stores (including optometrist stores), eyeglass providers (e.g., eyeglass brands), etc. In this regard, merchant server 130 may include processing applications, which may be configured to interact with user device 110 and/or payment provider server 140 to facilitate the sale of eyeglasses and related items to user 102. Merchant server 130 may correspond to a networked server for a plurality of merchant locations or for an online marketplace. Although only one merchant server is shown, a plurality of different merchants and merchant servers may operate similarly.

Merchant server 130 includes an inventory module 132, other applications 134, a database 136, and a network interface component 138. Inventory module 132 and other applications 134 may correspond to processes, procedures, and/or applications executable by a hardware processor, for example, a software program. In other embodiments, payment provider server 140 may include additional or different software as required.

Inventory module 132 may be configured to provide eyeglass information to user 102, offer eyeglasses for sale to user 102, and complete a transaction for eyeglasses with user device 110 and/or payment provider server 140. In this regard, inventory module 132 may access and provide an inventory of eyeglasses to user 102 through user device 110. Inventory module 132 may receive a request to view eyeglass information (e.g., color, size measurements, brand, etc.), 2D images of the eyeglasses, and/or 3D models of the eyeglasses. The eyeglass information may include 2D images, which, as previously discussed, may be taken with a specific distance, zoom, and/or aspect ratio. These 2D images may also be provided to payment provider server 140 to generate 3D models. Eyeglass information may further include eyeglass frame specifications, such as measurements, weight, color, material, etc. The eyeglasses frame information may further include price, sales/discount opportunity, or other financial information.

In addition to eyeglass information and 2D images of the eyeglasses, inventory module 132 may provide user 102 with 3D models of the eyeglasses after the 3D models are constructed by payment provider server 140. Thus, merchant server 130 may receive 3D models of eyeglasses from payment provider server 140 after providing 2D images of the eyeglasses to payment provider server 140. The 3D models may be presented to user 102 with information for the eyeglasses and/or the 2D images. Moreover, the 3D models may be presented on a likeness of the user, such as a facial likeness of user 102 taken from an image and/or video data captured of user 102. Inventory application may impose the 3D model of the eyeglasses on the likeness of user 102 or the 3D model may be communicated to user device 110 for presentation to user 102.

In various embodiments, merchant server 130 includes other applications 134 as may be desired in particular embodiments to provide features to merchant server 130. For example, other applications 134 may include security applications for implementing device/server-side security features, programmatic server applications for interfacing with appropriate application programming interfaces (APIs) over network 160, or other types of applications. Other applications 134 may contain software programs, executable by a processor, including a graphical user interface (GUI), configured to provide an interface to a user. In various embodiments, other applications 134 may include payment applications configured to interact with user device 110 and/or payment provider server 140 to complete payment for eyeglasses.

Additionally, merchant server 130 includes database 136. Database 136 may include merchant inventory and/or location information. For example, database 136 may include information about available eyeglasses and lenses for eyeglasses. Additionally, database 136 may include information about merchant locations where user 102 may pick up eyeglasses after purchase. In other embodiments, database 136 may include shipping information for available shipping of eyeglasses to user 102 and shipping information for user 102 (e.g., a physical address). After completing payment for eyeglasses, database 136 may include transaction history information. Database 136 may store other information relevant to user 102, such as images and/or video data of user 102 used with the 3D model of the eyeglasses to view the eyeglasses as they would appear on user 102.

In various embodiments, merchant server 130 includes at least one network interface component (NIC) 138 adapted to communicate with network 160 including user device 110 and/or payment provider server 140. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 140 may be maintained, for example, by an online payment service provider, which may provide 3D models of eyeglasses to merchant server 130. In this regard, payment provider server 140 includes one or more processing applications, which may receive eyeglass prescription information, provide eyeglass information to user 102, and complete payment for items between user device 110 and merchant server 130. In one example, payment provider server 140 may be provided by PAYPAL®, Inc. of San Jose, Calif., USA. However, in other embodiments, payment provider server 140 may be maintained by or include a merchant, financial services provider, and/or other service provider, which may provide user account and payment service to user 102. For example, 3D modeling of eyeglasses may be provided by EBAY®, Inc. of San Jose, Calif., USA. Although payment provider server 140 is described as separate from a merchant and/or merchant server corresponding to merchant server 130, it is understood that a merchant may include services offered by payment provider server 140.

Payment provider server 140 of FIG. 1 includes eyeglasses modeling module 150, a transaction processing module 142, other applications 144, a database 146, and a network interface component 148. Eyeglasses modeling module 150, transaction processing module 142, and other applications 144 may correspond to processes, procedures, and/or applications executable by a hardware processor, for example, a software program. In other embodiments, payment provider server 140 may include additional or different software as required.

Eyeglasses modeling module 150 may correspond to an application configured to receive at least one 2D image of a pair of eyeglasses and generate a 3D image of the eyeglasses. In this respect, eyeglasses modeling module 150 may receive the 2D image(s) of the eyeglasses from merchant server 130. Eyeglasses modeling module 150 may extract the contours of the features of the eyeglasses using the 2D image(s). In certain respects, eyeglasses modeling module 150 may require at least a front image of the eyeglasses and a side image of the eyeglasses (e.g., the frames of the eyeglasses). However, other embodiments may only require a single image where the image is taken at the proper position/perspective to enable extraction of the contours of the eyeglass frame and lenses. Once the contours are extracted and processed (e.g., smoothed and cleaned up), the location of the hinges of the eyeglasses may also be determined. The location of the hinges may be determined by finding a meeting place between contours of the frame around the lenses and contours of the side arms of the eyeglasses. Eyeglasses modeling module 150 may also determine a nose bridge feature and measurements of the nose bridge feature using the contours. Additionally parameters and options related to the nose bridge feature may be determined using information for the pair of eyeglasses. For example, the nose bridge feature may be in conjunction with the shape/size of the user's nose, the spatial relationship to the frame arms, and measurements of the user's face, including length from nose bridge to ears, Eyeglasses modeling module 150 may further determine a texture file for the pair of eyeglasses. The texture file may be determined through the color, surface quality/property, logos, shading, or other visual feature of the eyeglasses from the 2D images. Moreover, the texture file may use eyeglass information, such as materials, brand, and/or color information to determine the texture of the pair of eyeglasses. The texture file may further include information for the lenses, including shading, transmissivity, polarization, or other lens texture quality.

Using the contours, the hinges, and the texture file, eyeglasses modeling module 150 may build a 3D model of the pair of eyeglasses placing together the respective parts into a 3D model. The curves of the contours for the front, sides, and lenses may be extruded in the model. The lenses in the eyeglasses may be added and/or removed depending on the requirements of merchant server 130 and/or the model of the pair of eyeglasses. Moreover, the respective sizes of the contours taken from different 2D images may be scaled to correspond to the same scale/size using the 2D image and/or metadata for the 2D image. Once the contours/curves have been attached, the 3D model may be generated and a file/data for the 3D model may be communicated to merchant server 130 for presentation to user 102.

Transaction processing module 142 may be configured to receive information from user device 110 and/or merchant server 130 for processing and completion of financial transactions. Transaction processing module 142 may include one or more applications to process financial transaction information from user device 110 and/or merchant server 130. Transaction processing module 142 may receive a payment request to complete a sale transaction for an item for a pair of eyeglasses. Transaction processing module 142 may complete the sale transaction by providing payment to merchant server 130. Transaction processing module 142 may receive a user payment account for user 102 with payment provider server 140 to provide payment to merchant server 130. In other embodiments, transaction processing module 142 may receive user financial information, such as a payment card, bank account, gift card, or other financial information. Transaction processing module 142 may credit the payment to a payment account of merchant server 130 with payment provider server 140 or to another financial account, such as a bank account. In other embodiments, transaction processing module 142 may provide transaction histories, including receipts, to user device 110 and/or merchant server 130 in order to provide proof or purchase and complete the financial transaction.

In various embodiments, payment provider server 140 includes other applications 144 as may be desired in particular embodiments to provide features to payment provider server 140. For example, other applications 144 may include security applications for implementing server-side security features, programmatic server applications for interfacing with appropriate application programming interfaces (APIs) over network 160, or other types of applications. Other applications 144 may contain software programs, executable by a processor, including a graphical user interface (GUI), configured to provide an interface to a user.

Additionally, payment provider server 140 includes database 146. As previously discussed, user 102 and/or merchant server 130 may establish one or more user accounts with payment provider server 140. User accounts in database 146 may include user/merchant information, such as name, address, birthdate, payment/funding information, additional user financial information, and/or other desired user data. User 102 and merchant server 130 may link user accounts to user device 110 through a user, merchant, and/or device identifier. Thus, when an identifier is transmitted to payment provider server 140, e.g. from user device 110 and/or merchant server 130, a user account belonging to user 102 and/or merchant server 130 may be found. In other embodiments, user 102 and/or merchant server 130 may not have previously established a user account and may provide other financial information to payment provider server 140 to complete financial transactions, as previously discussed.

In various embodiments, payment provider server 140 includes at least one network interface component (NIC) 148 adapted to communicate with network 160 including user device 110 and/or merchant server 130. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
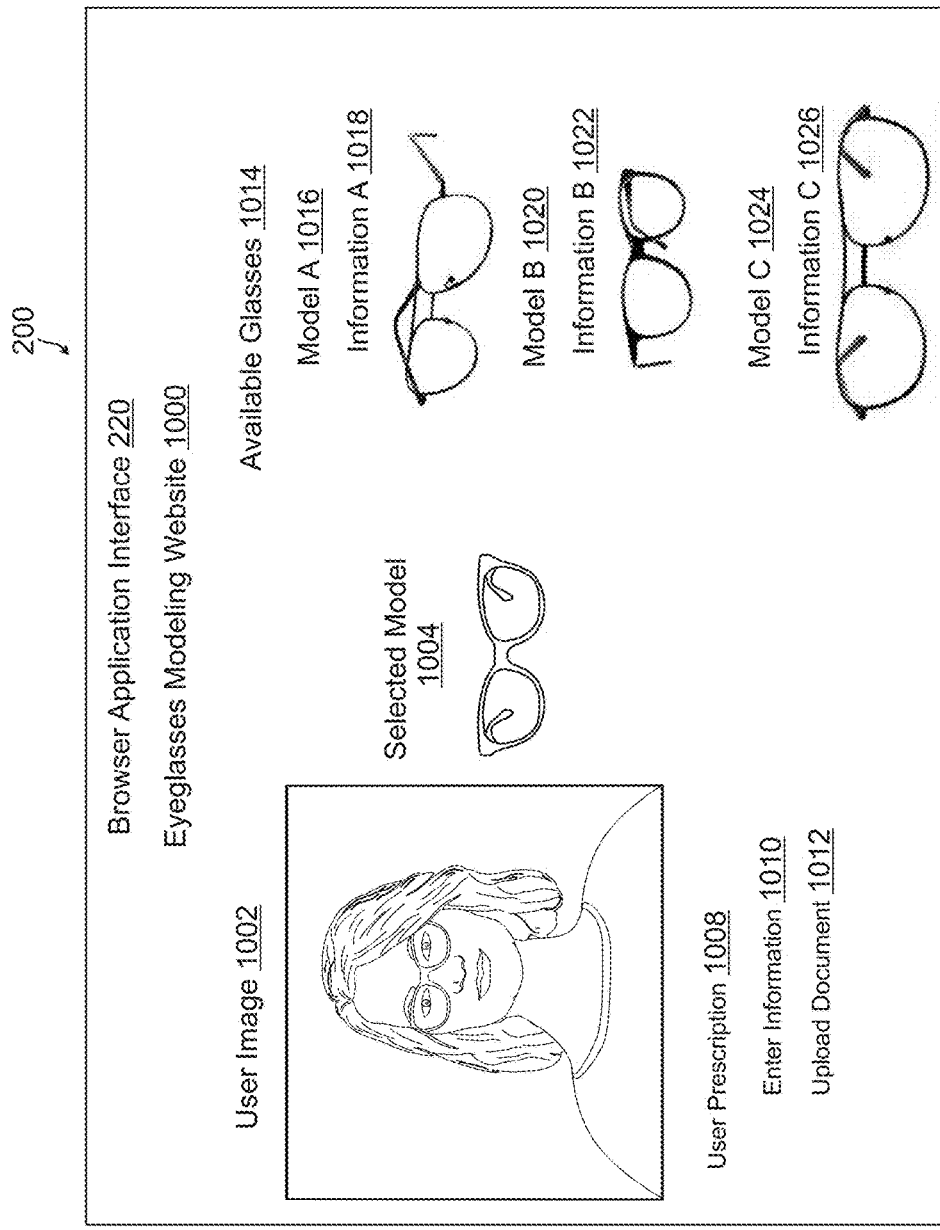
FIG. 2 is an exemplary browser interface for view 3D models of pairs of eyeglasses generated from 2D images, according to an embodiment.

FIG. 2 is an exemplary browser interface for viewing 3D models of pairs of eyeglasses generated from 2D images, according to an embodiment. Environment 200 includes a browser application interface 220 corresponding generally to the described processes and features of browser module 120 in environment 100 of FIG. 1.

Browser application interface 220 may correspond to a displayable interface of a browser application of a communication device, which may present an eyeglasses modeling website 1000 to a user. Eyeglasses modeling website 1000 may be used to view 3D models of pairs of eyeglasses, for example, to present the 3D models on an image of the user. Thus, eyeglasses modeling website 1000 includes a user image 1002, which may be used with available glasses 1014 to view the 3D models of available glasses 1014 on user image 1002. In this regard, the user may have chosen selected model 1004 for presentation on user image 1002. Thus, in field 1006, a graphical image, model, or presentation of user image 1002 with selected model 1004 presented on user image 1002 may be displayed to the user. The user may further enter additional information, such as user prescription 1008 in order to adjust field 1006. For example, lens size, shape, or other requirements may further adjust field 1006. The user may enter user prescription 1008 through a field to enter information 1010 or through an option to upload document 1012.

Available glasses 1014 may be generated using 2D images of available glasses 1014, as discussed herein. For example, two or more 2D images of available glasses 1014 may be processed to generate a 3D model of each of available glasses 1014. After generation of the 3D model, the 3D model may be presented through eyeglass modeling website 1000. For example, available glasses 1014 may include a model A 1016, a model B 1020, and a model C 1024. Model A 1016 may include associated information A 1018, such as pricing, measurements, available options, brand/item information, etc. Similarly, model B 1020 includes information B 1022 and model C 1024 includes information C 1026. The user of eyeglass modeling website 1000 may make selections of model A 1016, model B 1020, and model C 1024 in order to view additional 3D models of eyeglasses on user image 1002.

Figure 3:
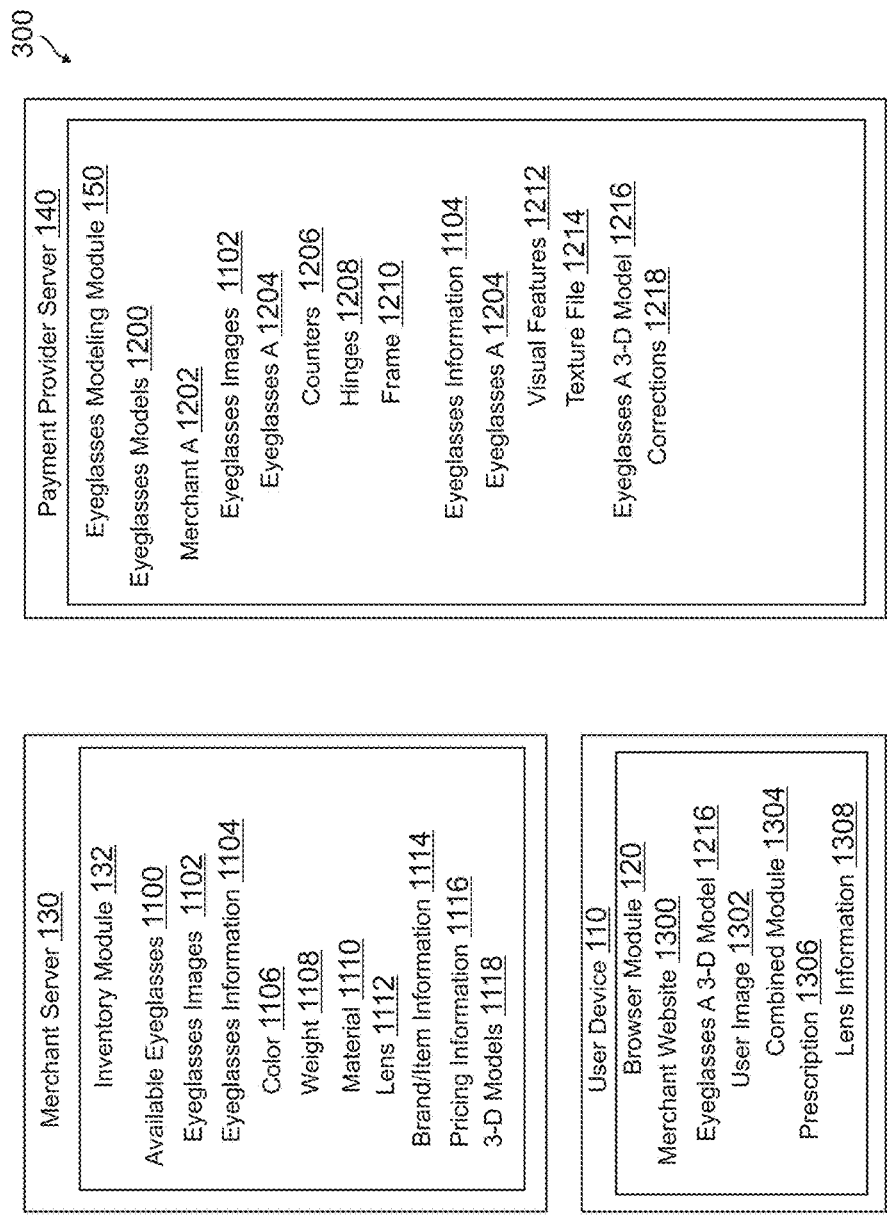
FIG. 3 is an exemplary system environment for 3D modeling of a pair of eyeglasses from available 2D images, according to an embodiment.

FIG. 3 is an exemplary system environment for 3D modeling of a pair of eyeglasses from available 2D images, according to an embodiment. Environment 300 of FIG. 3 includes user device 110, merchant server 130, and payment provider server 140 each from environment 100 of FIG. 1 executing module and processes discussed in reference to environment 100.

Merchant server 130 executes inventory model 132 corresponding generally to the specialized hardware and/or software modules and processes described in reference to FIG. 1. In this regard, inventory module 132 provides 2D images of pairs of eyeglasses to payment provider server 140 for modeling into 3D models of the pairs of eyeglasses. Thus, inventory module 132 includes available eyeglasses 1100, for example, eyeglasses sold by the merchant associated with merchant server 130. Available eyeglasses 1100 include eyeglass images 1102, which may include 2D images of eyeglasses, as well as other media for the eyeglasses including video media. Each of the pairs of eyeglasses includes eyeglass information 1104, which may include color 1106, weight 1108, material 1110, and lens 1112. All of the aforementioned information may be communicated to payment provider server 140 for processing. Moreover, inventory module 132 may further store brand/item information 1114 and pricing information 1116 for presentation with received 3D models 1118 from payment provider server 140.

Payment provider server 140 executes eyeglasses modeling module 150 corresponding generally to the specialized hardware and/or software modules and processes described in reference to FIG. 1. In this regard, eyeglasses modeling module 150 includes eyeglass models 1200, which may include modeling of pairs of eyeglasses from a merchant A 1202 (e.g., the merchant associated with merchant server 130). For example, merchant A 1202 may provide eyeglasses modeling module 150 with eyeglass images 1102, such as images for eyeglasses A 1204. Eyeglasses modeling module 150 may process the images for eyeglasses A 1204 as discussed herein. For example, contours 1206 of eyeglasses A 1204 may be extracted from the images using Canny edge detection, and cleaned up to generate a model of eyeglasses A 1204. Hinges 1208 may be determined based on intersections of contours 1206, and a frame 1210 may be constructed. Moreover using the images and eyeglass information 1104 for eyeglasses A 1204, visual features 1212 may be determined and a texture file 1214 generated. Thus, using the aforementioned information, eyeglasses A 3D model 1216 may be generated. Additionally, corrections 1218 may be applied to eyeglasses A 3D model 1216 in order to correct for errors and other alterations based on past modeling or known issues.

User device 110 executes browser module 120 corresponding generally to the specialized hardware and/or software modules and processes described in reference to FIG. 1. Browser module 120 may be utilized to display a merchant website 1300, where the user of user device 110 may view one or more 3D models of eyeglasses in order to make selections, model the eyeglasses on a user image, and/or purchase the eyeglasses. Thus, browser module 120 includes eyeglasses A 3D model 1216 from merchant server 130 and/or payment provider server 150. Eyeglasses A 3D model 1216 may be associated with a user image 1302, which may be used to generated a combined model 1304. Additionally, the user may provide additional information used to determined combined model 1304, such as a prescription 1306 including lens information 1308.

Figure 4:
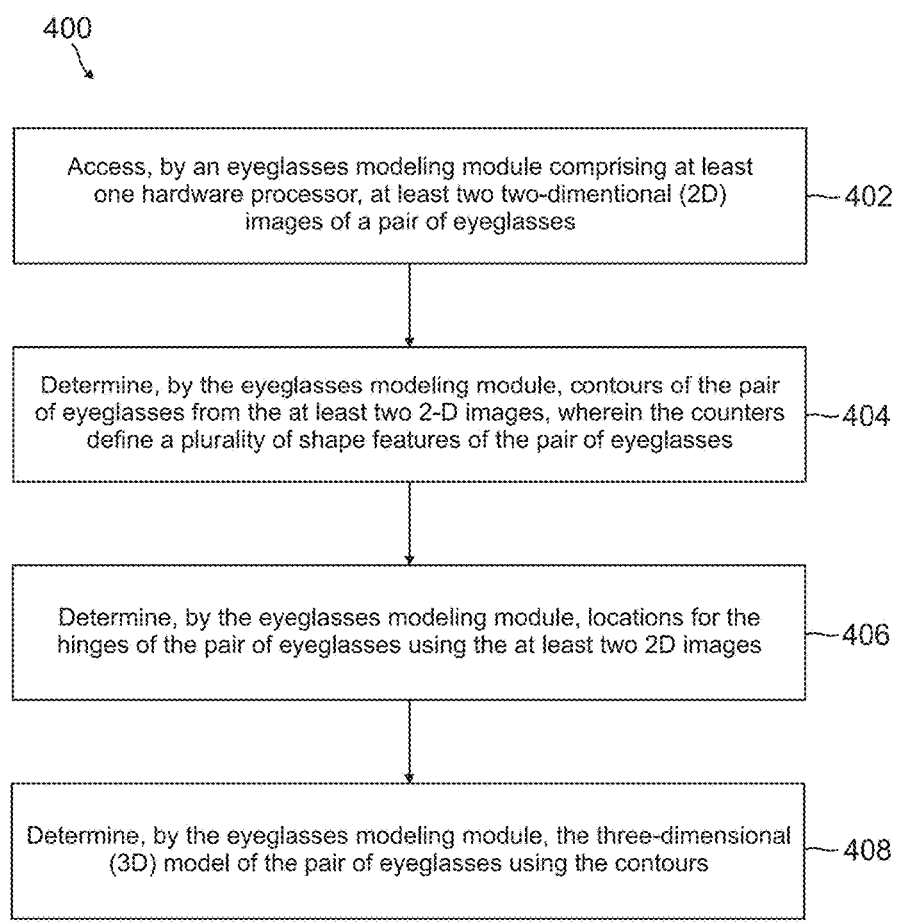
FIG. 4 is an exemplary method for three-dimensional eyeglasses modeling using two-dimensional images, according to an embodiment.

FIG. 4 is an exemplary method for three-dimensional eyeglasses modeling using two-dimensional images, according to an embodiment. Note that one or more steps, processes, and methods described herein may be omitted, performed in a different sequence, or combined as desired or appropriate.

At step 402, at least two two-dimensional (2D) images of a pair of eyeglasses are accessed, by an eyeglasses modeling module comprising at least one hardware process, for example, from a merchant device or server for a merchant, wherein the pair of eyeglasses is offered for sale by the merchant. Using the at least two 2D images, at step 404, contours of the pair of eyeglasses are extracted, by the eyeglasses modeling module, from the at least two 2D images, wherein the contours define a plurality of shape features of the pair of eyeglasses. The contours may be extracted by the eyeglasses modeling module using Canny edge detection.

Locations for the hinges of the pair of eyeglasses are determined using the at least two 2D images, at step 406. The contours may further define curves of a lens frame, a front, and arms for the pair of eyeglasses. The eyeglasses modeling module determines the hinges using the contours. For example, a meeting of two or more of the contours may define the hinges. Thus, at step 408, a three-dimensional (3D) model of the pair of eyeglasses is determined using the contours. The 3D model of the pair of eyeglasses may determined by generating a front, arms, and lenses of the pair of eyeglasses using the contours, and extruding the arms from the front. The eyeglasses modeling module may further clean up the contours to extract a best curve used to determine the 3D model. For example, the shape features may comprise arms of the pair of eyeglasses, a frame of the pair of eyeglasses, and front of the pair of eyeglasses, wherein the 3D model comprises the arms, the frame, and the front. Thus, the arms may be widened away from the frame and the front to fit a back of a head of the user in the image.

The eyeglasses modeling module may further determine texture information for the pair of eyeglasses, wherein the 3D model is further determined using the texture information. The texture information may be determined using at least one of the two 2D images of the pair of eyeglasses and information for the pair of eyeglasses. For example, the information for the pair of eyeglasses may comprise at least one of material for the pair of eyeglasses, brand information for the pair of eyeglasses, weight for the pair of eyeglasses, lenses for the pair of eyeglasses, and color information for the pair of eyeglasses. Thus, the texture information may comprise color, surface quality, surface properties, logos, shading, and lens. Additionally, a user may access a merchant website using a communication device for the merchant, wherein the user views the 3D model using the merchant website. The user may communicate an image of the user to the merchant website, wherein the merchant website displays the image of the user with the 3D model of the pair of eyeglasses.

Figure 5:
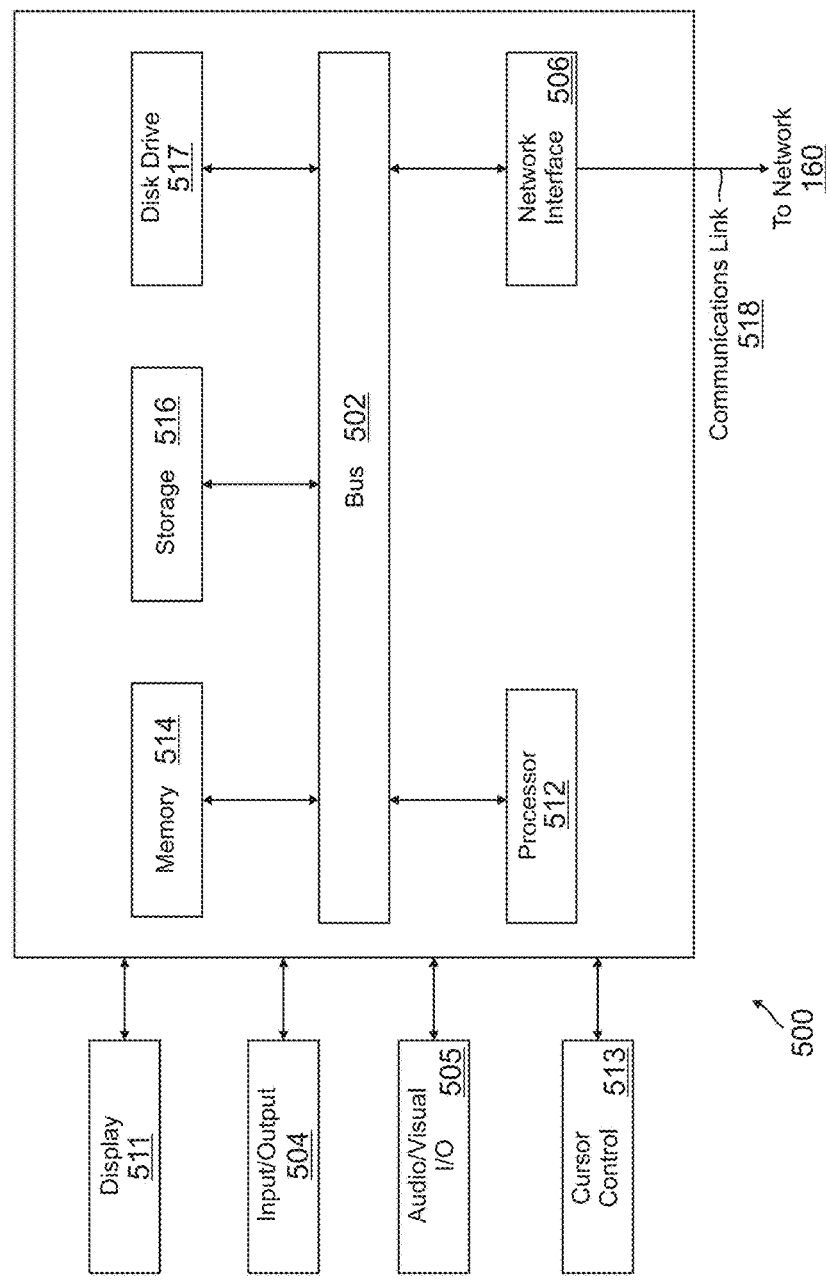
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one processor; and
   a memory coupled to the at least one processor and storing instructions that, when executed by the at least one processor, perform a method, comprising:
      accessing at least two two-dimensional (2D) images of a pair of eyeglasses;
      extracting a first contour of the pair of eyeglasses from a first image of the at least two 2D images and a second contour of the pair of eyeglasses from a second image of the at least two 2D images, wherein the first contour and the second contour define shape features of the pair of eyeglasses;
      determining, based at least in part, on a meeting place between the first contour and the second contour, locations for hinges of the pair of eyeglasses;
      determining, using at least one of the two 2D images, one or more visual features of the pair of eyeglasses;
      generating a three-dimensional (3D) model of the pair of eyeglasses using the first contour, the second contour, the visual features, the shape features and the determined location of the hinges, the 3D model including one or more arms extending from the determined location of the hinges; and
      providing the generated 3D model of the pair of eyeglasses on a user interface of a display device.

2. The system of claim 1, wherein the contours are extracted using Canny edge detection.

3. The system of claim 1, further comprising instructions for:
   creating a texture file using the determined visual features of the pair of eyeglasses; and
   using the texture file in the 3D model.

4. The system of claim 3, wherein the texture file includes additional information of the pair of eyeglasses.

5. The system of claim 4, wherein the additional information comprises at least one of a material of the pair of eyeglasses, brand information of the pair of eyeglasses, weight of the pair of eyeglasses, and lens information for the pair of eyeglasses.

6. The system of claim 1, wherein the visual features comprises one or more of color, surface quality, surface properties, logos, shading, and lens.

7. The system of claim 1, wherein first contour at least one of the first contour and the second contour define curves of a lenses frame.

8. The system of claim 1, further comprising instructions for generating at least one of a front and lenses of the pair of eyeglasses using at least one of the first contour and the second contour.

9. The system of claim 1, further comprising instructions for cleaning up at least one of the first contour and the second contour to extract a best curve.

10. A method, comprising:
   receiving, at least two two-dimensional (2D) images of a pair of eyeglasses, wherein the pair of eyeglasses is offered for sale by a merchant;
   extracting a first set of contours of the pair of eyeglasses from a first image of the at least two 2D images and a second set of contours of the pair of eyeglasses from a second image of the at least two 2D images, wherein the first set of contours and the second set of contours define a plurality of shape features of the pair of eyeglasses;
   determining, based at least in part, on a meeting place between the first set of contours and the second set of contours, locations for hinges of the pair of eyeglasses using the contours;
   determining, using at least one of the two 2D images, one or more visual features of the pair of eyeglasses;
   generating a three-dimensional (3D) model of the pair of eyeglasses using the first set of contours, the second set of contours, the visual features and the determined location of the hinges, the 3D model including one or more arms extending from the determined location of the hinges;
   automatically altering one or more of a size of the one or more arms and adjusting an angle of the one or more arms; and
   communicating the 3D model to the merchant for display.

11. The method of claim 10, wherein the shape features comprise one or more of a frame of the pair of eyeglasses and a front of the pair of eyeglasses.

12. The method of claim 11, further comprising superimposing the 3D model of the pair of eyeglasses on an image.

13. The method of claim 10, wherein the one or more arms of the 3D model are configured to fit at least a portion of an individual in an image.

14. The method of claim 10, wherein at least one of the first set of contours and the second set of contours are extracted using Canny edge detection.

15. The method of claim 10, wherein a location of the hinges may be adjusted based, at least in part, on received input.

16. The method of claim 10, further comprising determining a nose bridge feature of the pair of eyeglasses using the first set of contours and the second set of contours.

17. A non-transitory computer-readable storage medium comprising instructions that, when executed by a processing unit, cause the computer system to perform a method, comprising:
   receiving a selection of at least two two-dimensional (2D) images of a pair of eyeglasses displayed on a computing device;
   extracting a first set of contours of the pair of eyeglasses from a first image of the at least two 2D images and a second set of contours of the pair of eyeglasses from a second image of the at least two 2D images;
   determining locations for the hinges of the pair of eyeglasses using a meeting place between the first set of contours and the second set of contours;
   determining parameters of a nose bridge features of the pair of eyeglasses using the first set of contours and the second set of contours;
   determining parameters of one or more arms for the pair of eyeglasses using one or more of the first set of contours and the second set of contours;
   generating a three-dimensional (3D) model of the pair of eyeglasses using the first set of contours, the second set of contours, the one or more arms and the nose bridge feature; and
   providing the generated 3D model of the pair of eyeglasses on a user interface of a display device.

18. The non-transitory computer-readable storage medium of claim 17, further comprising instructions for providing the 3D model on an image on the user interface of the display device.

19. The non-transitory computer-readable storage medium of claim 17, further comprising automatically adjusting one or more of the parameters of the one or more arms.

20. The system of claim 1, further comprising instructions for automatically adjusting an angle of the one or more arms as the one or more arms extend from the determined location of the hinges.

\* \* \* \* \*